March 1, 1949.  G. H. HENDER  2,463,104
OPEN TOP REFRIGERATED DISPLAY CASE
Filed May 20, 1947
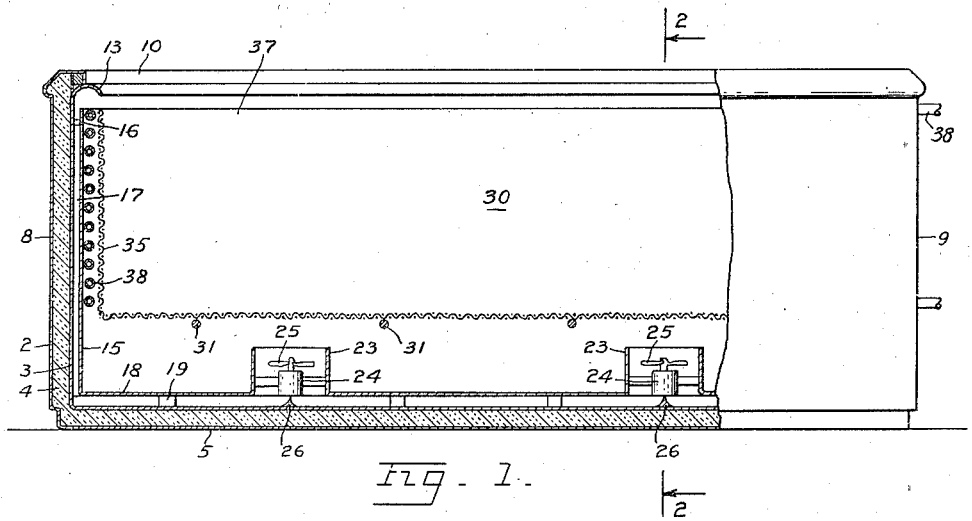
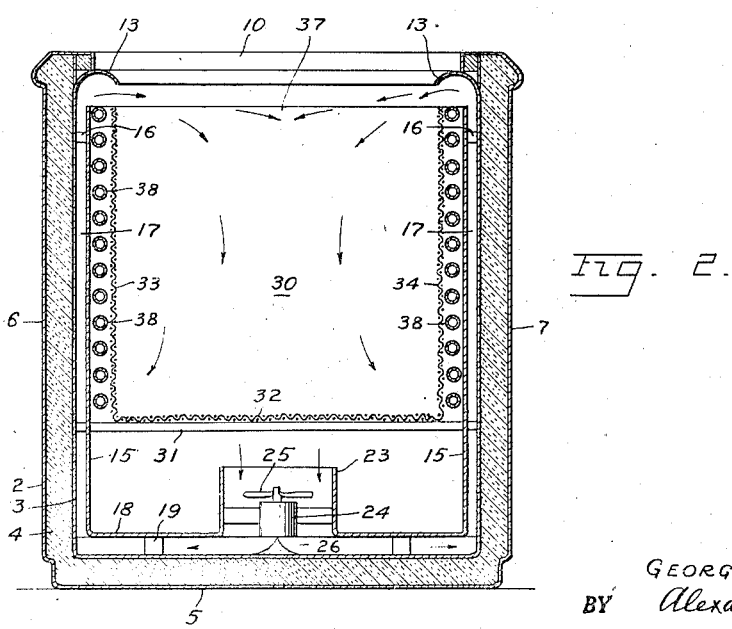
INVENTOR.
GEORGE H. HENDER
BY Alexander Riaboff
HIS ATTORNEY Patented Mar. 1, 1949

2,463,104

UNITED STATES PATENT OFFICE 2,463,104

OPEN-TOP REFRIGERATED DISPLAY CASE

George H. Hender, San Leandro, Calif.

Application May 20, 1947, Serial No. 749,127

5 Claims. (Cl. 62—89.6)

My invention relates to a refrigeration box, and particularly a refrigeration box which is kept open at all times.

The object of this invention is to provide an open refrigeration box for a grocery store or the like which is adapted to contain beer, milk, and food products, or frozen foods and ice cream, depending upon the temperature maintained in said box, said box to be kept open all the time to serve the customers.

Another object of this invention is to provide an open refrigeration box in which high or low temperature is evenly maintained at the top of said box.

Another object of this invention is to provide a refrigeration box of the type described within which a flow of cold air is created by a plurality of small electrically driven fans so that a desired temperature is constantly maintained from the top of said box to its bottom.

Another object of this invention is to provide an open refrigeration box in which a flow of cold air is sent from the bottom of the box to the walls, and along the latter upwardly to the top of the box and cooled on its way up, whereupon the cold air is deflected inwardly so as to blanket the top of the box therewith.

Other objects and advantages will appear as the specification proceeds and the particular features of the invention will be specifically pointed out in the appended claims.

My invention is illustrated in the accompanying drawing in which

Fig. 1 is a longitudinal central cross-section of the refrigeration box, some parts being shown in elevation; and Fig. 2 is a cross-section of said refrigeration box taken along the line 2—2 of Fig. 1.

In detail, my refrigeration box may be of any size, shape and design, and is shown in the drawing as being substantially rectangular in longitudinal and transverse cross-sections. The box consists of an outer shell 2 preferably made out of metal, an inner shell 3 also preferably metal, and a layer of insulating material 4 therebetween. Each shell has a bottom, side and end walls, forming a box bottom 5, side walls 6 and 7, and end walls 8 and 9. The top 10 of the box is open.

The side and end walls of the inner shell 3 are formed at its top with air deflectors 13 in form of arcuated reversed troughs extending inwardly, which air deflectors are located slightly below the open top 10.

Vertical partitions 15 are arranged in close proximity to the side and end walls of the inner shell 3 being preferably spaced about ½ inch therefrom by spacers 16. The partitions 15 extend from a point somewhat below the air deflectors 13 downwardly parallel to said walls and terminate some distance above said bottom 5, thus forming ducts 17 between said walls and partitions. The lower ends of the partitions 15 are connected by a false bottom 18 which extends over the bottom 5 and is supported by studs 19.

The false bottom 18 has a plurality of short vertical conduits 23 arranged on the central longitudinal axis of said box equi-distant from the walls thereof. The conduits 23 extend upwardly from said false bottom 18 and are open on both ends. Each conduit contains a very small electric motor 24, about 1/250 H. P., which drives a fan 25. The latter sucks the air from the above of the conduit 23 and sends it downwardly toward the bottom 5, wherein the air is deflected by a baffle 26 toward the walls of said box.

A food container 30 is placed inside of said box and is supported by a plurality of bars 31 extending across the latter. Said food container may consist of several compartments, or of several separate containers, and is shown in the drawing as having a bottom 32, side walls 33 and 34, and end walls 35 the top 37 of the container being open. The container 30 is preferably made out of wire mesh. The bottom 32 of said container is spaced from the tops of the conduits 23 while the walls thereof are substantially close to the partitions 15.

A plurality of coils of the pipe 38 carrying suitable refrigerant from a refrigerating unit, not shown in the drawings, is arranged around said container 30 between said container walls and said partitions 15 for the purpose of cooling the refrigeration box to a desired temperature.

The operation of the device is as follows: the motors 24 drive the fans 25, which draw air from the space above the conduits 23 into the latter and downwardly toward the bottom 5. The baffles 26 deflect the air toward the box walls and into the ducts 17. The air rises slowly upwardly to the top of said ducts 17. The refrigeration pipe 38 being located very close to the partition 15 cools the rising stream of air therethrough. The cold air is thereupon deflected by the air deflectors 13 toward the center line of the top of the food container 30, completely covering the top thereof with a stream of cold air, thus preventing outside warm air from entering said container. Food, even near the top of the container, remains cold all the time. Air from the container passes through the walls thereof toward said conduits, In order to provide an even flow of the air through the ducts 17 and keep the top of the box evenly covered with a stream of cold air, the fans 25 should be spaced about two feet from each other and about center from the walls.

This refrigeration box works equally well at high temperature around 40° F. and at low temperature around 0° F.

Having thus described my invention, I claim:

1. A refrigeration box comprising an insulated bottom and walls and having an open top; a plurality of air ducts arranged in said box in close relation to said walls; means for forcing the air along the bottom of the box and into said ducts; means for deflecting the air emerging from the ducts toward the center of the top of said box; a food container inside of said box; and means for cooling the air inside of said box.

2. A refrigeration box comprising an open box structure; a plurality of air ducts arranged in said box along the walls thereof; an open food container arranged in said box in spaced relation to the bottom thereof; means for cooling the container; means for drawing air from said container downwardly toward the bottom of the box and for forcing said air into the ducts and upwardly to the top of said box; and means for deflecting said air toward the center of the top of said container.

3. A refrigeration box comprising an open box structure; a container arranged in said box for articles to be refrigerated; a refrigerating coil around said container; means for creating an air flow from the bottom of said box upwardly along the walls thereof; and means for deflecting the air flow from the top of said wall toward the center of the top of the container.

4. A refrigeration box comprising an open box structure, a plurality of ducts arranged in said box along the walls thereof; an open food container arranged in said box in spaced relation to the bottom thereof; means for drawing air from said space between said container and the bottom of said box and forcing the same into said ducts; means for cooling the air in said ducts; means for deflecting the air emerging from said ducts toward the center of the top of said container.

5. A refrigeration box having an open top, insulated walls and a bottom; a partition arranged in close proximity of the box walls so as to form air ducts therebetween; a false bottom connecting said partitions and arranged in spaced relation to the bottom of the box, said false bottom carrying means for drawing air from above said false bottom and forcing the same toward the box bottom and into the air ducts; means for cooling air in said ducts; a deflector arranged at the top of the box walls for deflecting the ascending air in the ducts toward the center of said box; and a food container inside of said box.

GEORGE H. HENDER.

REFERENCES CITED

The following references are of record in the file of this patent:

UNITED STATES PATENTS

| Number | Name | Date |
| --- | --- | --- |
| 2,143,187 | Coulter | Jan. 10, 1939 |